United States Patent
Lambourne et al.

(10) Patent No.: US 10,483,037 B2
(45) Date of Patent: Nov. 19, 2019

(54) METHOD OF MANUFACTURING A MAGNETICALLY GRADED MATERIAL

(71) Applicant: ROLLS-ROYCE plc, London (GB)

(72) Inventors: Alexis Lambourne, Derby (GB); Iain Todd, Sheffield (GB)

(73) Assignee: ROLLS-ROYCE plc, London (GB)

( * ) Notice: Subject to any disclaimer, the term of this patent is extended or adjusted under 35 U.S.C. 154(b) by 431 days.

(21) Appl. No.: 15/347,953

(22) Filed: Nov. 10, 2016

(65) Prior Publication Data

US 2017/0169945 A1 Jun. 15, 2017

(30) Foreign Application Priority Data

Dec. 10, 2015 (GB) .................................. 1521763.1

(51) Int. Cl.
| | |
|---|---|
| *H01F 41/16* | (2006.01) |
| *H01F 1/03* | (2006.01) |
| *H02K 1/02* | (2006.01) |
| *H02K 1/27* | (2006.01) |

(52) U.S. Cl.
CPC ........... *H01F 41/16* (2013.01); *H01F 1/0306* (2013.01); *H02K 1/02* (2013.01); *H02K 1/27* (2013.01)

(58) Field of Classification Search
CPC .................................. H01F 41/14; H01F 41/22
See application file for complete search history.

(56) References Cited

U.S. PATENT DOCUMENTS

| | | | | |
|---|---|---|---|---|
| 5,782,953 A | * | 7/1998 | Shah ..................... | B22F 3/1109 419/29 |
| 2015/0115749 A1 | * | 4/2015 | Dial ....................... | H01F 1/147 310/46 |
| 2015/0332820 A1 | * | 11/2015 | Ishikawa ................ | C21D 10/00 335/296 |

FOREIGN PATENT DOCUMENTS

| | | |
|---|---|---|
| EP | 1533395 A1 | 5/2005 |
| EP | 2918395 A1 | 9/2015 |
| JP | 2006-351946 A | 12/2006 |
| JP | 2015/053823 A | 3/2015 |
| WO | 2013/185967 A1 | 12/2013 |
| WO | WO-2013185967 A1 * | 12/2013 ........... H01F 1/0577 |

OTHER PUBLICATIONS

Apr. 26, 2016 Search Report issued in British Patent Application No. 1521763.1.
H. Schneider. "Investment Casting of High-Hot-Strength 12% Chrome Steel". Foundry Trade Journal, May 5, 1960, pp. 562-563.
(Continued)

*Primary Examiner* — Dah-Wei D. Yuan
*Assistant Examiner* — Nga Leung V Law
(74) *Attorney, Agent, or Firm* — Oliff PLC

(57) ABSTRACT

A method of manufacturing a magnetically graded material, including depositing a steel filler material to a substrate, and applying a directed energy source to first and second regions of the filler material to thereby join the filler material to form a joined material. The energy source is directed to the first region while the first region is provided with an inert shield gas such that the material of the first regions includes a magnetic phase, and the energy source is directed to the second region while the second region is provided with a nitrogen containing shield gas to thereby impart an non-magnetic phase to the joined material.

12 Claims, 3 Drawing Sheets

(56) References Cited

OTHER PUBLICATIONS

J. Oñoro. "Martensite Microstructure of 9-12% Cr Steels Weld Metals". Journal of Materials Processing Technology, 2006, vol. 180, pp. 137-142.
L. Béres. "Proposed Modification to Schaeffler Diagram for Chrome Equivalents and Carbon for More Accurate Prediction of Martensite Content". Supplement to the Welding Journal, Jul. 1998, pp. 273-276.
Hughes, Austin. "Electric Motors and Drives". Third Edition, 2006, Elsevier.

\* cited by examiner

METHOD OF MANUFACTURING A MAGNETICALLY GRADED MATERIAL

The present disclosure concerns a method of manufacturing a magnetically graded material, and a component manufactured according to the method.

Electrical machines such as electric motors, actuators and generators require components such as rotors, stators etc which must carry magnetic flux generated by windings and permanent magnets of the machine. In general, such components must also carry mechanical load, and so the materials used and geometry of the component are in general a compromise between magnetic flux carrying capabilities, and mechanical strength. This compromise negatively affects the weight, power density and efficiency of the resultant electrical machine. Magnetically graded materials may also be desirable in other fields.

Examples of such compromised designs include switched reluctance motors, which comprise a wound stator and solid salient pole rotors. Prior switched reluctance motors are described in "Electric Motors and Drives", $3^{rd}$ edition, Austen Hughes, 2006 published by Elsevier, incorporated herein by reference.

When operated as a motor, electrical current in the stator provides a magnetic field, which interacts with the magnetic reluctance of the rotor to generate a torque, which tends to align a rotor pole with the nearest stator pole. Consequently therefore, the rotor salients must comprise a magnetic material. However, the saliency of the rotor results in windage losses, i.e. the projections of the rotor interact with the air within airgap in the motor to produce shear and turbulence, which generates heat and losses, resulting in inefficiencies when operated at high rotational rates. Consequently, it may be desirable to "fill in" the gaps between salient poles with non-magnetic material. However, manufacturing such rotors by conventional methods is difficult, in view of the risk of mechanical separation of the two materials.

A further example of where a magnetically graded material may be desirable includes internal permanent magnet machines (IPM), in which the rotor comprises two or more permanent magnets embedded within a non-magnetic "bridge" material. An IPM machine is distinct from a conventional surface mounted permanent magnet machine (SPM), in which the permanent magnets are installed on a radially outer surface of the rotor. Both motor types have high efficiency, but the IPM motor has additional torque because it utilizes both the magnet and reluctance torques generated by the magnetic saliency. Because the magnets of SPM motors need to be fixed on the rotor surface, mechanical strength is weaker than with IPM motors, especially at high speeds.

In some IPM designs, flux is focussed by splitting the magnets and forming a 'V' structure. Such an arrangement is used for example in the 2010 Toyota Prius, which uses an IPM motor with an 8-pole rotor and a 48-pole 3-phase winding stator. In this V magnet arrangement there is a small volume of non-magnetic material in the apex of the V, known as a "bridge region". The physical dimensions of the bridge material should be maximised to provide adequate mechanical strength, but minimised to minimise flux leakage.

A still prior electrical machine type comprises a flux guided synchronous reluctance machine (SRM). In this machine type, the rotor comprises a set of laminations shaped so that it tends to align itself to the magnetic field produced by the stator. The rotor then rotates at the stator frequency (i.e. is synchronous) with the poles of the rotor remaining in alignment with the stator poles. Examples of such electrical machines are described in "Electric motors and drives", $3^{rd}$ edition, Austen Hughes, 2006, published by Elsevier, p. 351.

In an SRM, slots may be provided in the rotor to concentrate and direct magnetic flux. While this improves performance from a flux leakage point of view, these slots will produce structural weakness. Again therefore, a design compromise is required as the physical dimension of the bridge material should be maximised to provide adequate mechanical strength, but minimised to minimise flux leakage.

One proposed method for overcoming these disadvantages is to provide an electrical machine component comprising a magnetically graded material, having regions having ferromagnetic properties, and other regions having non-magnetic properties, within a unitary, solid structure. One proposed technique for achieving such a graded material is described in US patent application 2015115749, which discloses subjecting areas comprising a body centred cubic (BCC) steel to a nitrogen containing gas at elevated temperatures, to thereby nitride the material, and transform the nitrided regions to a face centred cubic (FCC) microstructure. The remainder of the component is masked, to thereby retain ferromagnetic properties in those regions. However, such a process requires a further processing step, which increases manufacturing costs. Furthermore, it has been found that nitrogen atoms migrate into areas beneath the masking, resulting in inaccuracy of demarcation between the magnetic and non-magnetic areas. This precludes the use of this technique where high accuracy is required. Furthermore, the depth of the nitride layer is limited, such that only thin laminations can be functionalised using this method. Consequently, thick components must be built from multiple layers joined together, resulting in further process steps and reduced mechanical strength.

Accordingly, the present invention seeks to provide a method of forming a magnetically graded material and an article formed in accordance with the method, which overcomes some or all of the above disadvantages.

According to a first aspect of the present invention there is provided a method of manufacturing a magnetically graded material, the method comprising:

depositing a steel filler material to a substrate;

applying a directed energy source to first and second regions of the filler material to thereby join the first and second regions to form a joined material;

wherein the energy source is directed to the first region while the first region is provided with an inert shield gas such that the material of the first region comprises a magnetic phase, and the energy source is directed to the second region while the second region is provided with a nitrogen containing shield gas to thereby impart an non-magnetic phase to the second region.

Accordingly, the invention provides a method of manufacturing a magnetically graded material in a single process step. Since the filler material is joined using an energy source, multiple layers can be formed as in a conventional Additive Layer Manufacture (ALM) process, permitting the manufacture of in thicker articles than those formed by prior art processes.

The magnetic phase may comprise a ferromagnetic phase, and may comprise one or more of a body centred cubic ferritic microstructure, a Martensite microstructure, a cementite microstructure, and a Bainite microstructure. The non-magnetic phase may comprise a paramagnetic phase, and may comprise a face centered cubic phase microstructure, and may comprise an austenitic microstructure.

The filler material may comprise a powder. The step of depositing the filler material may comprise entraining the powder within a carrier gas. The shield gas may comprise the carrier gas. Alternatively, or in addition, the shield gas may comprise an environmental gas.

The inert shield gas may comprise a noble gas, and may comprise one or more of argon, hydrogen, helium, carbon dioxide, xenon, neon, or mixtures thereof. The inert shield gas may be substantially free of nitrogen, and may be substantially free of oxygen.

The steel filler material may comprise less than approximately 0.05% carbon. The steel filler material may comprise a nickel equivalent of less than 20%, and may comprise a chromium equivalent of more than 10%. In one example, the steel filler material comprises 20% chromium, 5% manganese, less than 0.05% carbon, the remainder consisting of iron and incidental impurities. In a further example, the steel filler material comprises 0.01% carbon, 19% Chromium, 2% nickel and up to 0.4% nitrogen when subjected to a nitrogen containing shield gas, the remainder consisting of iron and incidental impurities.

The step of applying the energy source to the second region may comprise applying the energy source such that the second region may contain greater than 0.1% nitrogen, and may contain between 0.1 and 0.5% nitrogen, and may contain between 0.1% and 0.4% nitrogen.

The energy source may comprise one of a laser beam and an electron beam.

According to a second aspect of the present invention, there is provided an electrical machine component formed in accordance with the first aspect of the present invention.

The electrical machine component may comprise a rotor of an electrical machine, and may comprise a rotor of an internal permanent magnet motor comprising at least one pair of slots for a permanent magnet. Each slot may be at least partly defined by the first region of material, and a bridge region between the slots may be defined by the second region of material.

Alternatively, the electrical machine component may comprise a rotor of an electrical machine, the rotor comprising at least one magnetic region circumferentially spaced by a plurality of non-magnetic regions to form a plurality of radially magnetically salient regions. The electrical machine may comprise a switched reluctance machine. Alternatively, the rotor may comprise a magnetic region defining a plurality of radially spaced, part circumferentially extending airgaps bridged in a circumferential direction by at least one non-magnetic region provided therebetween. The electrical machine may comprise a synchronous reluctance machine.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
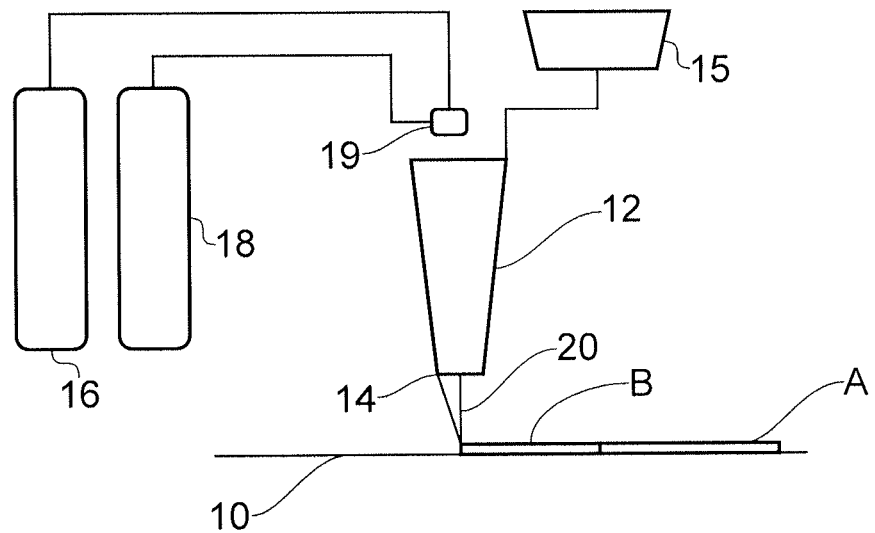
FIG. 1 is a schematic drawing of an apparatus for forming a component in accordance with the method of FIG. 1.
Figure 2:
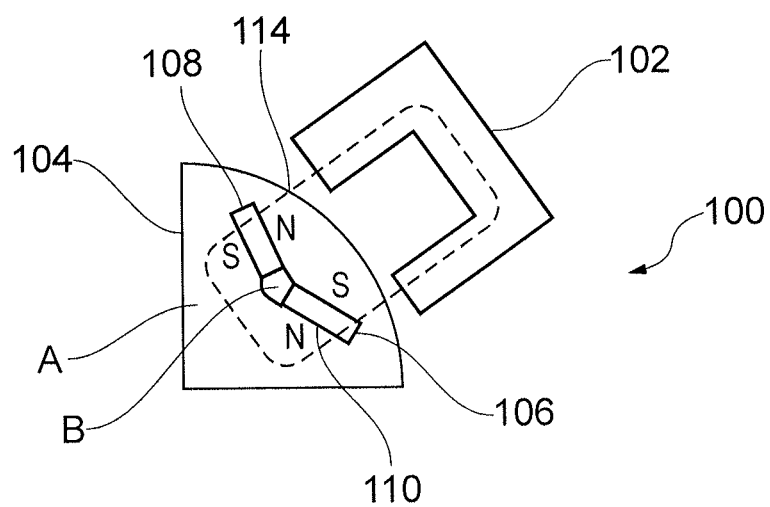
FIG. 2 is a sectional view through part of a first electrical machine comprising a component manufactured in accordance with the method of FIG. 1.
Figure 3:
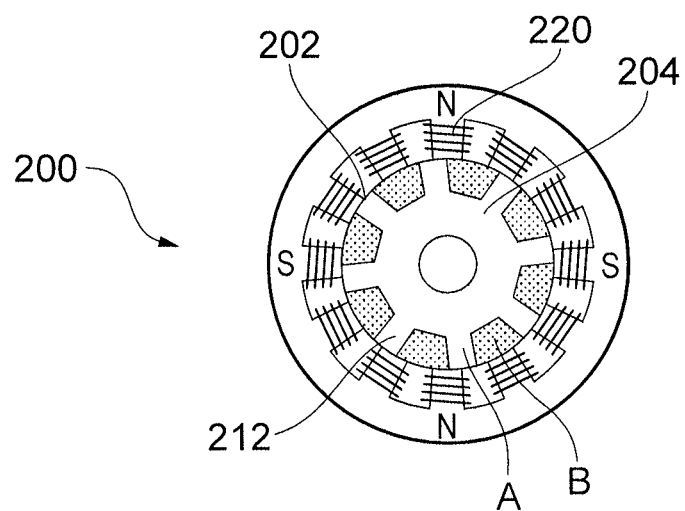
FIG. 3 is a sectional view through part of a second electrical machine comprising a component manufactured in accordance with the method of FIG. 1.

Referring to FIGS. 1 to 3, a method of manufacturing a first magnetically graded electrical machine component is shown.

FIG. 1 shows an apparatus suitable for carrying out the method. The apparatus comprises a "blown powder" Selective Laser Sintering (SLS) apparatus such as that provided by Trumpf™. Alternative suitable machines can be provided by any of DMG MORI™, BEAM™, Optomec™ and others. The apparatus comprises a moveable substrate bed 10, on which a powdered filler steel material is deposited by a deposition/laser head 12 by a carrier gas.

The deposition head 12 comprises at least one nozzle 14 configured to provide filler material in the form of a fine powder provided from a hopper 15 entrained within a carrier gas. The carrier gas is provided from either a first or a second cylinder 16, 18, as selected by a valve 19, as will be described in further detail below. The deposition head 12 further comprises an energy source in the form of a laser 20, which can be focussed on the substrate to sinter or melt deposited powder filler material. The substrate bed 10 can be raised or lowered (or the head 12 height raised or lowered) to maintain the head 12 to substrate distance as subsequent layers are deposited on the bed 10.

The powder comprises a steel alloy, which, when supplied to the apparatus, comprises a stable magnetic phase, but which forms a stable non-magnetic phase when nitrided, i.e. when nitrogen atoms are incorporated into the alloy. In general, the alloy comprises iron and nickel, and optionally comprises one or more of nickel, carbon, manganese, molybdenum, niobium and silicon. Preferably, the alloy comprises relatively low levels of carbon (for example, less than 0.05%), and relatively high levels of chromium (for example, approximately 20% of more). For example, the alloy may comprise chromium equivalent ($Cr_{eq}$) of approximately 20% or greater, in accordance with equation 1:

$$Cr_{eq} = Cr + Mo + 1.5Si + 0.5Nb$$

The alloy may further comprise a nickel equivalent ($Ni_{eq}$) less than approximately 20%, and preferably less than 12%, in accordance with equation 2:

$$Ni_{eq} = Ni + 30C + 0.5Mo + 30N$$

It will be understood that alternative alloy compositions could be utilised, provided that the alloy forms a stable magnetic phase when a low nitrogen content is present in the alloy, and a stable non-magnetic phase when a relatively high nitrogen content is present in the alloy.

Figure 5:
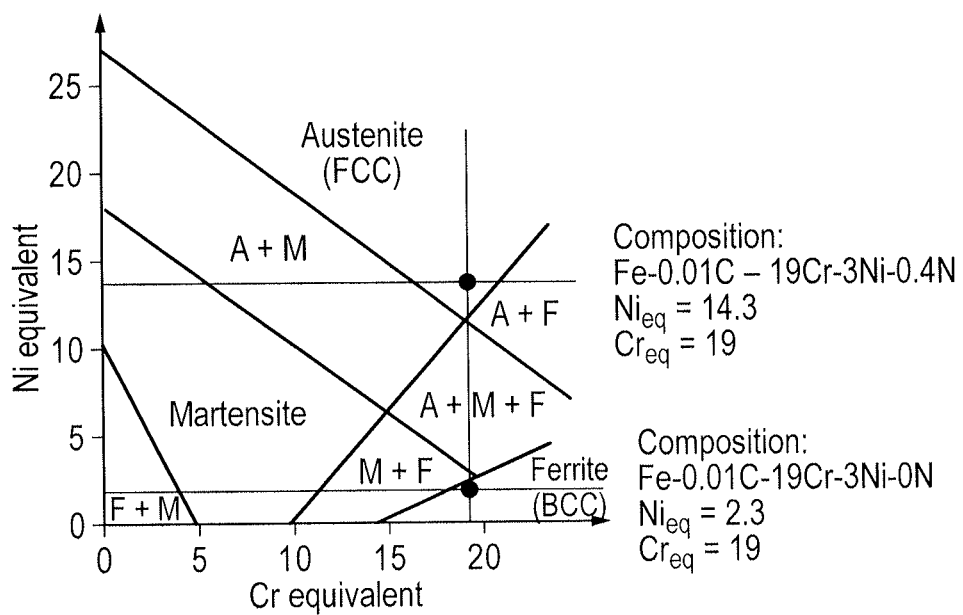
FIG. 5 is a DeLong/Schaeffler diagram illustrating how nitrogen content affects the magnetic phase of various steel alloys.

Generally, the nitrogen content of the powder prior to deposition is minimal, and may be less than 0.1% for example. In one example, a steel filler material as supplied consisting of 20% chromium, 5% manganese, less than 0.05% carbon, the remainder consisting of iron and incidental impurities, with substantially no nitrogen, has been found to be suitable. Alternatively, a composition consisting of 0.01% carbon, 19% chromium and 3% nickel, with the remainder being iron and incidental impurities, has also been found to be suitable. FIG. 5 is a "DeLong diagram" adapted from: [1] H. Schneider, "Investment casting of high-hot strength 12% chrome steel", Foundry Trade J. 108 (1960) 562-563, [2] J. Onoro, "Martensite microstructure of 9-12% Cr steels weld metals", J. Mat. Proc. Tech. 180

(2006) 137-142 and [3] L. Béres "Proposed Modification to Schaeffler Diagram for Chrome Equivalents and Carbon for more accurate prediction of martensite content", Welding Research Supplement, (1998) 273-276. FIG. 5 shows the effect that various alloy compositional elements have on the resulting stable phase of the alloy. The phrase "stable phase" will be understood as referring to a phase which remains once the material has cooled. As can be seen, referring to FIG. 5, the example alloys described above will have a high $Cr_{eq}$ and a low $Ni_{eq}$, and consequently can be expected to have a ferritic, body centred cubic (BCC) microstructure, and so have ferromagnetic properties, i.e. have a high magnetic permeability. With reduced $Cr_{eq}$, and/or increased $Ni_{eq}$, the alloy will be expected to comprise either Martensite, or a mixture of martensite and ferrite. As will be understood, martensite is also a magnetic steel, having a high magnetic permeability. As will be understood by considering FIG. 5, increasing nitrogen content will convert a given alloy composition to either austenite, or a mixture comprising austenite and one or both of martensite and ferrite. In accordance with equations (1) and (2), it will be understood that $Ni_{eq}$ can be increased by increasing any of the compositional elements listed in equation 2, weighted accordingly. Consequently, where the $Ni_{eq}$ is higher, less nitrogen will be required to transform the alloy to austenite, which comprises a face centred cubic (FCC) microstructure. Austenite is a paramagnetic, i.e. non-magnetic phase, i.e. a phase having a low magnetic permeability.

Referring again to FIG. 5, the material of region A has a nominal composition of 0.01% carbon, 19% chromium and 3% nickel, with the remainder being iron and incidental impurities, and so substantially consists of ferromagnetic ferrite, while the material of region B has a nominal composition of 0.01% carbon, 19% chromium, 3% nickel and 0.4% nitrogen, with the remainder being iron and incidental impurities, and so substantially consists of paramagnetic austenite. As can be seen from FIG. 6, a wide range of alloys can be designed which can be effectively transformed from a stable magnetic phase to a stable non-magnetic phase in accordance with this disclosure.

Referring to FIG. 1, filler material is deposited on the bed 10 to define a first region A. The valve 19 is operated such that the nozzle 14 is supplied with an inert shield gas in the form of a carrier gas such as argon from the first cylinder 16, such that the powdered filler material is entrained within the inert shield gas. The environment surrounding the head 12 is maintained at atmospheric pressure, and also comprises the inert shield gas.

Simultaneously with depositing the filler material, the laser 20 is actuated to heat the deposited powder in the first region A on the bed 10 to a sintering temperature, such that the powder particles bond to adjacent particles, thereby forming a solid layer of material. Due to the inert shield gas, the nitrogen content of the alloy is unaltered, and so, once cooled, the first region A comprises a stable, magnetic phase, such as martensite, ferrite, cementite or bainite, depending on the alloy composition, having a high magnetic permeability. Generally, the sintering/melting temperature is approximately 1400° C. or above, though it will be understood that the temperature will be dependent on the alloys used in the filler material.

Filler material is deposited on the bed 10 to define a second region B. The valve 19 is operated such that the nozzle 14 is supplied with nitrogen containing shield gas such as pure nitrogen (or a gas mixture containing nitrogen and an inert gas) from the second cylinder 18, such that the powdered filler material is entrained within the nitrogen containing shield gas.

Simultaneously with depositing the filler material, the laser 20 is actuated to heat the deposited powder in the second region B on the bed 10 to a sintering/nitriding/melting temperature of approximately 1400° C. or above (though it will be understood that the sintering temperature will be dependent on the alloys used in the filler) such that the powder particles bond to adjacent particles, thereby forming a solid layer of material adjacent the first region A. Due to the nitrogen containing shield gas and the high temperature, nitrogen diffuses into the alloy during the period at which the temperature is raised to above the nitriding temperature (which would typically be approximately 450° C.), while the powder is entrained within the carrier gas, and/or when the powder is deposited on the substrate, such that the nitrogen content of the alloy is increased to at least approximately 0.1% (again, dependent on alloy composition), and so, once cooled, the second region B comprises a stable phase having a low magnetic permeability, such as austenite. In view of the high temperatures involved, and the finely divided powder, nitriding occurs rapidly, in contrast to conventional nitriding processes, which take several hours to occur. Consequently, a magnetically graded material is formed. In general, the sintering and nitriding temperatures will vary depending on the process conditions, and in particular on the material of the filler powder. As can be seen, at a temperature of 1400° C. or greater in this example, the powder will be both sintered and nitrided when a nitrogen containing shield gas is present. The regions A and B abut and are joined to one another, such that a unitary material is formed.

The above process is repeated for additional layers of material, thereby gradually building up a three-dimensional structure, as is conventional in the art of 3-d printing. Each layer may comprise further first and second regions A and B, while some layers may comprise only first or second regions A, B. However, at least one first region A is adjacent at least one second region B, which may be located in different layers.

FIG. 2 shows a segment of a first example of a component 100 of an electrical machine formed in accordance with the above described method. The component comprises a rotor 100 of an internal permanent magnet motor/generator. The motor further comprises a stator 102.

The rotor 100 comprises a main body 104, which comprises first and second regions, A, B and a plurality of slots 106. First and second permanent magnets 108, 110 are installed within the slots 106, such that a magnetic circuit 114 is formed between the permanent magnets 108, 110 and stator 102 when in use. The permanent magnets may comprise a rare earth magnet such as Nd—Fe—B—Dy alloy.

The first region A comprises the majority of the main body 104, and in particular, is located at north and south poles of the magnets 108, 110, and at distal ends.

The first region A is formed in accordance with the first step of the above method, such that the first region A comprises magnetic, ferritic material.

A gap is defined between the first and second magnets 108, 110, through which flux leakage would normally occur, which defines a "bridge" region B. In order to minimise flux leakage, the second region B is formed in accordance with the second step of the above method, such that the second region B comprises austenitic, paramagnetic (i.e. non-magnetic) material. Consequently, flux leakage is minimised, while maintaining a strong, unitary main body 104. Consequently, substantially all of the magnetic flux follows the primary magnetic circuit, with a minimum flux leakage between the poles of the magnets 108, 110, via the bridge. The elimination of flux leakage allows the unitary structure of the main body 104 to be optimised to provide high strength. The rotor 104 may have a significant thickness, since the process can be used to provide thick components, and so does not require the use of multiple layers of laminations.

FIG. 3 shows a second electrical machine 200 having a component 202 formed by the process described above. The component comprises a rotor 202 of a switched reluctance machine, which further comprises a stator having wound salient poles 220. The rotor 200 comprises a circular in plan main body 204, comprising a magnetic region A, and a plurality of non-magnetic regions B. The magnetic and non-magnetic regions are formed in accordance with the above described method. The magnetic region A comprises a central, circular in plan disc region, and a plurality of radially extending salients 212, to define a magnetically salient machine rotor. Adjacent salient regions 212 define part circumferentially extending gaps in between, which are filled with non-magnetic regions B, such that the magnetic and non-magnetic regions A, B together define a generally circular in plan rotor, containing no overall projections. Consequently, the rotor is magnetically salient, while having no physical projections, which would cause windage in use. Consequently, the rotor is physically robust, and efficient in operation.

Figure 4:
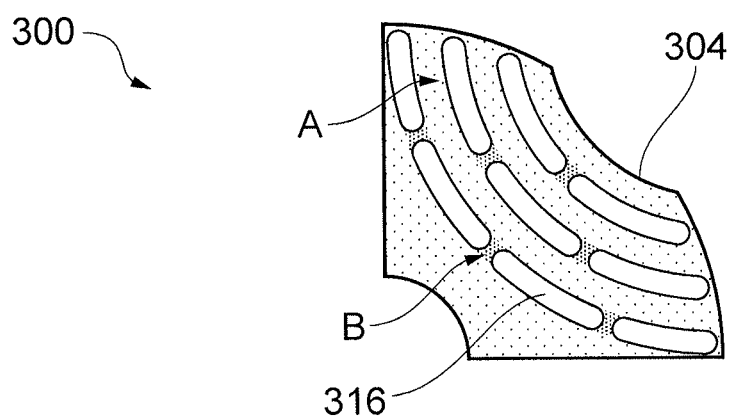
FIG. 4 is a sectional view through part of a third electrical machine comprising a component manufactured in accordance with the method of FIG. 1.

FIG. 4 shows a third electrical machine component 300 formed by the process described above. The component comprises a rotor 300. In this case, the electrical machine comprises a flux guided synchronous reluctance machine. Machines of this type are for example described in Austen, page 351.

A flux guided reluctance machine rotor comprises a rotor comprising a magnetic material, with radially spaced, part circumferentially extending airgaps located in between. However, these airgaps weaken the rotor, and therefore a compromise design is generally provided, in which the airgaps are segmented, with radially extending non-magnetic material extending therebetween. Such a design provides a balance between a magnetically optimised design and a mechanically optimised design.

A segment of a cross section through the rotor 300 of the present disclosure is shown in FIG. 4. The rotor 300 comprises a main body 304 comprising a magnetic region A and a plurality of circumferentially extending, radially spaced airgaps 316. The airgaps are segmented with segments being circumferentially spaced, with non-magnetic regions B being provided therebetween. Since the non-magnetic regions are magnetically similar to the airgaps (i.e. they have similar magnetic permeability and so prevent magnetic flux leakage), and have similar structural strength to the magnetic material in region B, the rotor can be both magnetically and mechanically optimised. Since the above described process can be used to produce rotors having significant structural depth, the strength of the rotor is improved compared to rotors formed of multiple laminations. Consequently, the rotor can have a varying cross-section throughout its depth.

It will be understood that the terms "magnetic" and "non-magnetic" refer to materials having relatively high and relatively low magnetic permeability respectively, i.e. the material having a magnetic phase has a higher magnetic permeability than the non-magnetic phase. It will be understood that, unless specified otherwise, all compositional percentages are given as weight percentages.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, alternative additive layer manufacturing processes may be used. An electron beam could be used in place of the laser. Alternatively, a wire sintering process could be employed. It will be understood that, in many cases, the powder deposition and powder heating steps could be carried out separately, rather than simultaneously. The second region could be deposited and/or heated prior to the first region.

A different inert gas could be used in place of argon, provided the inert gas does not contain nitrogen. Preferably, neither the inert gas nor the nitrogen containing gas comprise oxygen. Suitable alternative inert gasses include a mixture of argon and hydrogen, helium (which may optionally be mixed with argon), carbon dioxide (which again may optionally be mixed with argon), other noble gasses (such as xenon or neon), or mixtures thereof.

The invention claimed is:

1. A method of manufacturing a magnetically graded material, the method comprising:
   in an additive layer manufacture process:
      depositing a powder or wire material to a substrate; and
      applying a directed energy source comprising one of a laser and an electron beam to first and second regions of the powder or wire material to thereby join the first and second regions to form a joined material; wherein
   the energy source is directed to the first region while the first region is provided with a shield gas comprising an inert shield gas such that the material of the first region comprises a magnetic phase,
   the shield gas is changed to comprise a nitrogen containing shield gas when the energy source is directed to the second region such that the second region is provided with the nitrogen containing shield gas to thereby impart an non-magnetic phase to the second region, and the inert shield gas is substantially free of nitrogen.

2. The method according to claim 1, wherein the magnetic phase comprises a ferromagnetic phase.

3. The method according to claim 2, wherein the magnetic phase comprises a body centred cubic ferritic microstructure comprising at least one of a martensite microstructure, a cementite microstructure, and a bainite microstructure.

4. The method according to claim 1, wherein the non-magnetic phase comprises a paramagnetic phase.

5. The method according to claim 4, wherein the non-magnetic phase comprises a face centered cubic phase microstructure comprising an austenitic microstructure.

6. The method according to claim 1, wherein the inert shield gas comprises one or more of argon, hydrogen, helium, carbon dioxide, xenon, neon, or mixtures thereof.

7. The method according to claim 1, wherein the steel filler material may comprise less than approximately 0.05% weight of carbon.

8. The method according to claim 7, wherein the steel filler material comprises 20% weight of chromium, 5% weight of manganese, less than 0.05% weight of carbon, the remainder consisting of iron and incidental impurities.

9. The method according to claim 1, wherein the steel filler material comprises an alloy having a nickel equivalent weight percent of less than 20%.

10. The method according to claim 1, wherein the steel filler material comprises an alloy having a chromium equivalent weight percent greater than 10%.

11. The method according to claim 1, wherein the step of applying the energy source to the second region comprises applying the energy source such that the second region contains greater than 0.1% weight of nitrogen.

12. The method according to claim 11, wherein the step of applying the energy source to the second region comprises applying the energy source such that the second region contains between 0.1 and 0.4% weight of nitrogen.

* * * * *